United States Patent [19]

Bekooij et al.

[11] 4,331,574

[45] May 25, 1982

[54] PROCESS FOR PREPARATION OF WATER-THINNABLE EPOXY RESINS

[75] Inventors: Jurrianus Bekooij; Werner T. Raudenbusch; Stephen A. Stachowiak, all of Amsterdam, Netherlands

[73] Assignee: Shell Oil Company, Houston, Tex.

[21] Appl. No.: 241,163

[22] Filed: Mar. 6, 1981

[30] Foreign Application Priority Data

Apr. 25, 1980 [GB] United Kingdom ............... 8013744

[51] Int. Cl.$^3$ .................. C09D 3/52; C09D 3/58; C09D 5/40
[52] U.S. Cl. .................. 525/530; 528/110; 528/111.3; 523/414; 524/901
[58] Field of Search .................. 260/22 D, 22 EP, 21

[56] References Cited

U.S. PATENT DOCUMENTS

| | | | |
|---|---|---|---|
| 2,658,885 | 11/1953 | D'Alelio | 260/53 |
| 3,336,241 | 8/1967 | Shokal | 260/2 |
| 3,707,526 | 12/1972 | Gannon et al. | 260/47 EA |
| 3,749,758 | 7/1973 | Gannon | 260/22 EP |
| 4,051,088 | 9/1977 | Gibson | 260/22 EP |
| 4,098,735 | 7/1978 | Tobias | 260/18 EP |
| 4,119,595 | 10/1978 | Bauer et al. | 260/21 |
| 4,123,454 | 10/1978 | Buxbaum | 260/22 D |

FOREIGN PATENT DOCUMENTS 1556201 1/1977 United Kingdom .

*Primary Examiner*—Ronald W. Griffin
*Attorney, Agent, or Firm*—Norris E. Faringer

[57] ABSTRACT

Resinous compounds suitable for aqueous thermosetting coating dispersions or solutions after neutralization, are prepared by reacting a diglycidyl ether of a dihydric phenol with a hydroxyalkane monocarboxylic acid and dimerized unsaturated fatty acids, with epoxy equal to or in slight excess over carboxyl, below 150° C. in the presence of an epoxy/carboxyl esterification catalyst to produce a non-acidic intermediate, and then reacting the intermediate at a temperature below 150° C. with a polycarboxylic acid anhydride in amounts to provide an acid value from 5 to 35. Aqueous dispersions are prepared by at least 50% neutralization of such compounds having acid value 5–15.

12 Claims, No Drawings

4,331,574

PROCESS FOR PREPARATION OF WATER-THINNABLE EPOXY RESINS

FIELD OF THE INVENTION

The present invention relates to a process for the preparation of carboxyl-containing resinous compounds, especially epoxy compounds, which are thinnable in water after at least partial neutralization with a base. Such resins can be used as binder components in thermosetting lacquers and paints for the coating of objects.

BACKGROUND OF THE INVENTION

It is known that water-soluble epoxy resin derivatives can be used in aqueous thermosetting coating systems, for example, for electrodeposition onto metals. British Pat. No. 1,556,201, for example, discloses resinous compounds prepared by reacting in the temperature range of from 100° to 150° C. hydroxyl-containing resinous intermediates with sufficient polycarboxylic acid anhydride to produce a resinous compound having an acid value of at least 35 mg KOH/g. The resinous intermediate is prepared by reacting below 150° C., a polyglycidyl ether of a dihydric phenol with a hydroxyalkane monocarboxylic acid or a mixture thereof with a saturated aliphatic dicarboxylic acid having 4 to 12 carbon atoms per molecule. The intermediate is essentially carboxyl-free by the choice of a proper equivalent ratio of components, the use of rather low temperatures, and the use of a catalyst promoting the esterification of epoxy groups with carboxyl groups. The final resinous compounds are then diluted with a lyotropic solvent such as a glycol ether and neutralized with a base. These compositions can then be further diluted with water to make an aqueous solution for an electrodeposition bath. As the solids content in such a bath is rather low (at most 20%w solids) this procedure is quite satisfactory. However, difficulties arise when the procedure has to be adapted for aqueous lacquers and paints where organic solvents are not desired, and a more concentrated aqueous binder system is required, as for application by spraying and dipping. When not diluted, the resinous compounds as disclosed have usually melting points above 100° C., and the viscosities before and after neutralization are too high for easy handling without dilution with a solvent. Furthermore, at room temperature the neutralized aqueous systems form usually a stiff paste in concentrations above 30 weight percent of binder.

It is further known that aqueous dispersions of thermosetting binders can be used in coating compositions. Aqueous dispersions, in which the binder is dispersed in water instead of dissolved, have the advantage that higher binder concentrations can be used without viscosity problems, and that it is easier to evaporate the water in the coating from a dispersion than from a solution. A drawback, however, is usually that surface-active agents or dispersion stabilizers have to be added, which additives have generally an unfavorable effect on the properties of the hardened coating in that they tend to increase the water sensitivity.

Aqueous dispersions of thermosetting compounds can be made in general from resinous compounds having acid values below about 30, by neutralization and dilution with water. However, the type of resinous compound described in British Pat. No. 1,556,201, even with acid values below 30, can hardly be used for industrial production of aqueous dispersion paints. An improvement has now been found which allows this type of resinous compound to be used for the preparation of aqueous dispersions, and furthermore, provides processing advantages for the preparation of aqueous systems for use in electrodeposition. The improvement, from the point of view of starting materials, is the replacement of the saturated aliphatic dicarboxylic acid having up to 12 carbon atoms per molecule by dimerized unsaturated fatty acids, and from the point of view of the product, the use of a polycarboxylic acid anhydride in an amount to produce a resinous component having an acid value from about 5 to about 35.

SUMMARY OF THE INVENTION

The invention provides a process for the preparation of carboxyl-containing resinous compounds, suitable for making water-dilutable or water-thinnable coating compositions after at least partial neutralization with a base, wherein a non-acidic hydroxyl-containing resinous intermediate is reacted with a polycarboxylic acid anhydride at a temperature of not higher than 150° C., wherein said resinous intermediate is prepared by reacting below about 150° C. in the presence of an esterification catalyst in one or more steps, (a) a diglycidyl ether of a dihydric phenol having a weight per epoxide (WPE) of less than 600 with (b) a hydroxylalkane monocarboxylic acid and (c) dimerized unsaturated fatty acids in an epoxy or acidic equivalent ratio of (a), (b) and (c) of from $x/2/(x-2)$ to $(x+0.1x)/2/(x-2)$, wherein $x=4$ for a diglycidyl ether having a WPE from 400 to 500 and $x=6$ to 8 for a diglycidyl ether having a WPE from 170 to 250, is reacted with a polycarboxylic acid anhydride in an amount to produce a half-ester having an acid value of from 5 to 35 mg KOH/g.

DESCRIPTION OF THE PREFERRED EMBODIMENTS

The diglycidyl ether of the dihydric phenol is preferably a diglycidyl ether of 2,2-bis(4-hydroxyphenyl)propane (DPP); the general formula of such diglycidyl ethers is

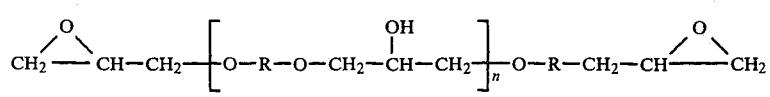

wherein R represents the divalent group

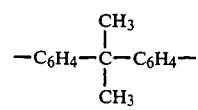

and n has an average value of from about 0 to 3. A small part of the terminal epoxy group may be hydrated due to hydrolysis during the manufacture. The diglycidyl ethers can further be defined by the weight per epoxy (WPF) which is the weight (in grams) of resin containing 1 gram equivalent of epoxide. Diglycidyl ethers of DPP having a WPE of from 170 to 250 are the so-called "liquid" epoxy resin. At room temperature the commercial products are viscous liquids. In the general formula above, the value of n for these liquid resins may vary from zero to 0.5.

In the present process, diglycidyl ethers of the DPP having a WPE of from about 400 to 550 are preferred. Such resins are solid resins having melting points, usually in the range of from 65° to 75° C. and in the above formula the value of n is about 2.

For some applications, glydicyl ethers of novolac resins, i.e., phenol-aldehyde condensates, may be employed. Suitable glycidyl novolacs and their preparation are disclosed in U.S. Pat. No. 2,658,885.

Other suitable epoxy compounds which may be used in lieu of or in combination with the diglycidyl ethers of DPP or diglycidyl novolacs include those compounds derived from polyhydric phenols, such as DPP, having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241; issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the hydrogenated phenol is hydrogenated Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein, shall be deemed to mean the glycidyl ethers of polyhydric phenols wherein the aromatic ring structure of the phenols have been or are saturated.

An idealized structural formula representing the preferred saturated epoxy compounds is as follows:

wherein n has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(3-hydroxyphenyl)propane, sometimes called the diglycidyl ethers of 2,2-bis(4-cyclohexanol)propane.

Hydroxylalkane monocarboxylic acids may have one or more alcoholic hydroxyl groups per molecule. Suitable examples include hydroxy acetic acid, lactic acid, hydroxybutyric acid, hydroxy caprylic acid, 12-hydroxy stearic acid. Preferred are dimethylol propionic acid and lactic acid.

Dimerized unsaturated fatty acids (also named dimer acids) are mainly dicarboxylic acids obtained by oligomerization of $C_{18}$ unsaturated fatty acids such as linoleic acid. Useful commercial dimer acids may contain minor amounts (up to 10 weight percent) of trimerized unsaturated fatty acids, and minor amounts (at most 3%w) of monomeric unsaturated fatty acids.

Suitable polymerized fatty acids and their preparation are adequately described in U.S. Pat. No. 4,119,595, and so much of that disclosure relevant to polymerized fatty acids is incorporated herein by reference.

In a first stage, a non-acidic hydroxyl-containing resinous intermediate is prepared by reacting the diglycidyl ether (a) with the hydroxylalkane monocarboxylic acid (b) and the dimer acid (c) in substantially equivalent ratios of epoxy components to carboxyl components, with preferably a slight excess of diglycidyl ether (a) to ensure that the acid value of the intermediate will be $\leq 4$, preferably $\leq 2$ mg KOH/g, which is considered as non-acidic.

An average molecular weight of the intermediate between 2000 and 3000 is further preferred, and the equivalent ratios of (a), (b), and (c) can therefore be defined as being from $x/2/(x-2)$ to $(x+0.1x)/2/(x-2)$, wherein x is 4 for a diglycidyl ether having a WPE of from about 400 to about 550 and x is 6 to 8, preferably 6, for a diglycidyl ether having a WPE of from 170 to 250.

As will be appreciated, this means that the average molecule of intermediate will be linear, and on average, terminated on both sides of the chain by a hydroxylalkane carboxylate ester group.

In a preferred embodiment the acidic components (b) and (c) are first reacted with an equivalent amount of the diglycidyl ether (a) until essentially all epoxy has reacted and the acid value remains constant, say $\leq 10$ in 2-4 hours, whereupon up to 10 percent diglycidyl ether is added in excess, to react with remaining carboxyl groups, until the acid value is $\leq 4$, preferably $\leq 2$. Reduction of acid value to $\leq 2$ is especially desirable for obtaining good reproducible results in aqueous dispersions.

Further requirements in the preparation of the intermediate are the reaction conditions. The temperature should be kept below about 150° C., and a catalyst for esterification of a carboxylic acid group with an epoxy

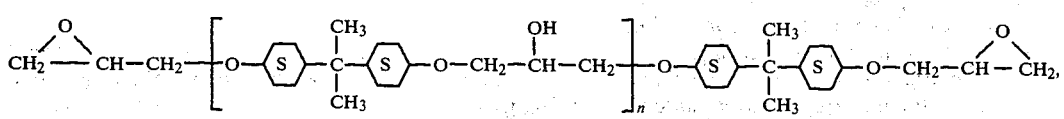

group should be present so as to avoid reaction of aliphatic hydroxyl groups with epoxy groups or carboxyl groups.

Examples of esterification catalysts for epoxy/carboxyl reactions are alkali metal hydroxides such as potassium hydroxide, metal salts such as stannous octoate, onium salts such as the sulfonium, phosphonium and quaternary ammonium salts, and in particular, tertiary amines such as benzyl dimethylamine. A preferred tertiary amine is triethanolamine.

The amount of esterification catalyst is preferably from 0.1 to 1 percent by weight of reactants. Solvents are usually not applied, because they would have to be removed afterward, but may be used if desirable.

Suitable solvents, if employed, include the aromatic solvents such as benzene, toluene, xylene, ketones such as acetone, methyl ethyl ketone (MEK) and methyl isobutyl ketone (MIBK); alcohols such as isopropanol, hexanediol; glycol ethers and esters such as those marketed under the trade designation OXITOL ® and CELLOSOLVE ®.

The resinous intermediate is reacted in the second stage of the present process with a polycarboxylic acid anhydride, which for the purpose of this invention is defined as a compound having one carboxylic acid anhydride ring:

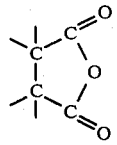

per molecule. The anhydride may contain further a carboxylic acid group. Examples are the anhydrides of aliphatic, aromatic, or alicyclic dicarboxylic acids, such as maleic, succinic, dodecenyl succinic, phthalic, tetrahydrophthalic, hexahydrophthalic, endomethylene tetrahydrophthalic, and methyl endomethylene tetrahydrophthalic anhydride. Examples of anhydrides containing further one carboxylic group are trimellitic anhydride and adducts of maleic anhydride with ethylenically unsaturated fatty acids, with trimellitic anhydride being preferred.

The anhydride is added to the intermediate, and the mixture reacted at a temperature not higher than about 150° C., preferably at 130° C.–145° C., during 20 minutes to 1 hour. Under these conditions an anhydride group reacts with a hydroxyl group of the intermediate to give a half-ester resinous compound, containing one free carboxyl group for every anhydride group reacted.

The amount of anhydride is calculated to produce a resinous compound having an acid value of from 5 to 35, and preferably to 30 mg KOH/g.

For acid values below 30, the calculated value is practically equal to the value determined; above 30, the value found may be lower than the calculated value.

Acid values from 5 to 15 are preferred for the preparation of resinous compounds for aqueous dispersions, with acid values from 6 to 10 being especially preferred.

Acid values from 20 to 30 are preferred for resinous compounds to be used in aqueous solutions.

The range of reactions, starting materials and reaction conditions as defined have the advantage that the properties of the final resinous compounds can be kept easily within very narrow limits and that batch-to-batch variaions are minimized. This is of particular advantage for the preparation of concentrated aqueous dispersions without the use of surfactant or dispersion stabilizers.

For the preparation of aqueous coating compositions, the resinous compounds are neutralized at least 50% with a base. For aqueous dispersions the degree of neutralization preferred is from 60 to 90%, in particular from 70 to 80%. For aqueous solutions the resinous compounds may be neutralized completely.

Requirements for pH may further affect the exact degree of neutralization chosen. For aqueous dispersions, pH values from 6 to 9 are generally preferred, with pH values from 7 to 8.5 being especially preferred.

The base and water are preferably added slowly, with slight stirring, for example, with an anchor stirrer, to the hot resinous compound, at a temperature of, for example, from about 80° C. to about 100° C., and preferably from 90° to 95° C. The base may be an alkali metal hydroxide (only for preparation of electrodeposition systems), but is preferably a nitrogen base. Ammonia was found to be suitable, but preferably the nitrogen base is an amine. For aqueous dispersions the preferred amines are 2-amino-2-methyl-1-propanol and 2-dimethylamino-2-methyl-1-propanol, because of superior results in dispersion stability and compatibility with cross-linking agents.

Thermosetting aqueous coating compositions may be prepared by addition of cross-linking agents to the resinous compounds before or after neutralization. Preferred are water-soluble cross-linking agents of the aminoplast-type, such as alkoxylated reaction products of formaldehyde with malamine or benzoguanamine.

Other cross-linking agents are urea-formaldehyde resins, phenolformaldehyde resins, and blocked polyisocyanates. The usual weight ratios of the resinous compound and the cross-linking agent are from 95:5 to 70:30, with weight ratios from 85:15 to 75:25 being preferred.

Very suitable such cross-linking agents include the so-called amino resins or amino-plasts containing —NH$_2$ groups derived from urea and melamine. Suitable amino-containing resins are prepared by reacting urea or melamine with formaldehyde under well-known conditions to form a reaction monomer first and then, by condensation polymerization, a large number of varying types of polymeric intermediates are formed. The preparation of urea-formaldehyde and melamine-formaldehyde resins is well-known in the art and forms no part of the present invention. Their use in crosslinking epoxy resins mostly through methylol groups is well-known. Accordingly, a large number of aminoplast and phenol-plast resins, i.e., urea-formaldehyde and melamine-formaldehyde resins, are commercially available under such trade designations as Plaskon, Beetle, Cymel, Fiberite, Resimene, Curacron and Beckamine, among many others.

Pigments, fillers, dispersing agents, and other components known in the art of paint formulation may be added, and if desired small amounts of water-miscible volatile organic solvents. For improved stabilization of aqueous dispersions up to 5%w of methanol, ethanol, or isopropanol may be useful. Addition of small amounts (up to about 1%w) of non-ionic surfactant may be useful for further stabilization of aqueous dispersions, or improvement of the wetting during application. The water for use in the aqueous compositions is preferably purified, such as by distillation or demineralization. The water-dilutable compositions may be applied by a variety of methods known in the art, onto a variety of substrates, in particular, metals such as bare steel, phosphated steel, zinc, tin plate (for can coating), and aluminum, to produce cured coatings of desirable thickness, from 2 micrometers upward up to, in general, 40 micrometers.

Curing can be performed by stoving, for example, at temperatures from 150° to 220° C., with curing times varying from 2 to 30 minutes.

The neutralized resinous compounds having acid values from 20 to 30 may be applied by electrodeposition and other methods such as by spraying or dipping. The neutralized resinous compounds having acid values from 5 to 15 forming aqueous dispersions, are preferred for methods where a high solids content at workable viscosity of the lacquer or paint is appreciated, such as by spraying, dipping, roller coating, and so on.

The following examples are given to illustrate the preparation and use of the instant water-thinnable resin compositions. It is understood that the examples are embodiments only and are given for the purpose of illustration only and the invention is not to be regarded as limited to any specific components and/or specific conditions recited therein. Unless otherwise indicated, parts and percentages are parts and percentages by weight.

Polyether A is a liquid diglycidyl ether of 2,2-bis(4-hydroxyphenyl)propane having a WPE of 190.

Polyether D is a solid diglycidyl polyether of 2,2-bis(4-hydroxyphenyl)propane having a WPE of 470 and a melting point (Kofler) of 60° C.

Dimer acid is a commercial dimerized unsaturated fatty acid ($C_{18}$) containing 95%w dimer, 4%w trimer and 1%w monomer acids; the acid value is 195 mg KOH/g.

AMP is 2-amino-2-methyl-1-propanol.

DMAMP is 2-dimethylamino-2-methyl-1-propanol.

Aminoplast 1123 is a commercial benzoguanamine/formaldehyde resin, etherified completely with methanol/ethanol, non-volatiles <2%w.

Aminoplast 301 is a commercial liquid hexamethoxymethyl melamine, non-volatiles <2%w.

Water is demineralized water.

"Solids" means content of non-volatiles after 30 minutes at 160° C.

The wedge bend test is for testing suitability as a can coating wherein a coated tin plate panel is bent over a 3 mm mandrel, impacted into a wedge shape, and immersed into a $CuSO_4/HCl$ solution for 2 minutes. Any breaks in the film will be stained, and the staining is recorded in mm staining per 10 cm total length of the panel.

MEK resistance is the number of double rubs to be given a cured coating with a piece of cotton cloth soaked in MEK (methyl ethyl ketone) to soften the surface.

For stabilization resistance, the cured coating panels were examined immediately after sterilization (90 minutes in water at 120° C.; Scale: 0 is bad, 5 is unaffected) for cross hatch type adhesion and blushing.

EXAMPLE I

A. Polyether D (1880 g, 4 epoxy equivalent) is heated with stirring to 145° C. Dimethylol propionic acid (268 g, 2 acid equivalent), dimer acid (574 g, 2 acid equivalent) and triethanolamine (6.8 g.; 0.25%w on solids) are added and the heating (145°–148° C.) and stirring are continued for 2½ hours. The acid value is then 6.1 and the WPE of about 20,000, indicating that essentially all epoxy is consumed. More Polyether D (94 g, 0.2 epoxy equivalent) is added, and heating at 145°–148° C. is continued for another 2½ hours. The resinous intermediate so obtained has an acid value of 1.9, and a WPE of 27,000.

B. For the preparation of the resinous compound, 100 g of this intermediate is reacted at 140° C. with 1.0 g of trimellitic anhydride (5.2 mmol) for 30 minutes.

This amount of trimellitic acid was calculated to give a final acid value 7.6 (found: A.V. 7.5).

C. For making aqueous dispersions several batches of resinous compound as prepared at B were used. Each batch was heated to 90°–95° C., the required amount of base as indicated, to neutralize about 75% of the carboxyl groups, and water to make up for 50%w solids were added at that temperature with slow stirring by an anchor stirrer. The bases used were:

(a) AMP: 0.91 g (10.2 mmol);
(b) DMAMP: 1.20 g (10.2 mmol);
(c) ammonia 2.5%w: 7.0 g (10.3 mmol).

By this method, the resinous compounds dispersed easily in water. The aqueous dispersions were cooled with slow stirring to room temperature.

The dispersions had milky appearance, particle size mainly below 1 micrometer, pH 6.5 to 7.2, and remained stable for more than 3 months' storage at room temperature or at least 2 months' storage at 40° C.

D. Coating compositions were prepared by mixing the dispersions (pH adjusted to 8 and 9) with the aminoplasts 1123 and 301 in a weight ratio of resinous compound/aminoplast of 80/20. The coating compositions neutralized with (a) and (b) had a storage life of more than 3 months at room temperature, and more than 1 month at 40° C. Neutralized with (c), the storage life at room temperature was 1–2 weeks but could be raised to more than 3 months by stabilization with 1%w of a non-ionic surfactant.

The coating compositions were tested as can coating materials onto tin plate panels. After drying and stoving at 200° C. during 12 minutes the properties were:

| | | |
|---|---|---|
| film thickness | 4–5 | micrometers |
| wedge bend | 20–25 | mm/10 cm |
| sterilization resistance | 4–5 | |
| (water, 90 minutes 121° C.; scale: 0 is bad, 5 unaffected) | | |
| MEK double rubs | 40–60 | |

EXAMPLE II

The procedure of Example I was repeated, with the difference that the dimethylol propionic acid was replaced by an equivalent amount of lactic acid. Neutralizing agent (c) and aminoplast 301 were used. The aqueous coating dispersions were examined as a can coating on tin plate panels (stoving: 12 minutes at 200° C.). The curing coatings (thickness 4–5 micrometers) had a wedge bend of 24 mm/10 cm, an MEK resistance of 45 double rubs, and a rating 5 for sterilization resistance.

EXAMPLE III

Polyether A (114.0 g, 0.6 epoxy equivalent) was heated with stirring to 145° C. Dimethylol propionic acid (26.8 g, 0.2 mol), dimer acid (114.8 g, 0.4 acid equivalent) and benzyldimethylamine (0.625 g, 0.25%w on solids) were added and the heating (145°–148° C.) and stirring were continued for 4 hours. The acid value was 4.6 and the WPE>20,000, indicating that essentially all epoxy was consumed. More Polyether A (2.5 g, 0.013 epoxy equivalent) was added, and the heating was continued for another 2 hours. The acid value was then 1.64 mg KOH/g. 100 g of this intermediate were heated at 140° C. with trimellitic anhydride (1.1 g, 5.72 mmol) during 30 minutes (the acid value was then 8.0, and the resinous compound cooled to 90° C.-95° C. Aqueous 2.5%w ammonia (7.3 g, for 75% neutralization) and water to make up for 50%w solids were added at that temperature with slow stirring (anchor stirrer).

A stable aqueous dispersion was formed. Aminoplast 301 was added (weight ratio of resinous compound/aminoplast of 80/20) and the aqueous lacquer tested as a can coating on tin plate. After cure (12 minutes to 200° C.) the wedge bend and sterilization resistance (water) were good.

EXAMPLE IV

Resinous intermediate according to Example IA (750 g) was reacted with trimellitic anhydride (33 g; 0.17 mol) at 140° C. during 30 minutes. The resinous compound (acid value 25) was cooled to 95° C., diluted with ethylene glycol mono-butyl ether (330 g), neutralized with AMP (31.5 g, 100% neutralization), and sufficient water was added to produce a 25%w solids aqueous solution. The clear solution (60 parts) was further diluted with water (40 parts), and aminoplast 301 (3.75 parts) was added. This coating composition was examined for use as a can lacquer by electrodeposition onto tin plate panels (100 V, 0.75 seconds). The panels were rinsed with water and stoved at 200° C. during 4 minutes.

Film properties were:

| film thickness | 3-4 micrometers |
|---|---|
| appearance | good |
| MEK double rubs | 100 |
| pasteurization resistance (30 minutes, 80° C.) | no deterioration |
| sterilization resistance (water, 90 minutes, 120° C.) | good |
| wedge bend (mm/10 cm) | 25-30 |

The experiment was repeated with the difference that the ethylene glycol monobutyl ether was omitted. The neutralized aqueous solution was slightly turbid, but the results of the evaluation were essentially the same.

What is claimed is:

1. A process for the preparation of carboxyl-containing resinous compounds, suitable for making water-dilutable coating compositions after at least partial neutralization with a base, which comprises reacting a non-acidic hydroxyl-containing resinous intermediate with a polycarboxylic acid anhydride at a temperature up to about 150° C., wherein said resinous intermediate is prepared by reacting below about 150° C. in the presence of an esterification catalyst, in at least one step (a) a diglycidyl ether of a dihydric phenol having a weight per epoxide (WPE) not exceeding 600 with (b) a hydroxyalkane monocarboxylic acid and (c) dimerized unsaturated fatty acids in an epoxy or acidic equivalent ratio of (a), (b) and (c) from $x/2/(x-2)$ to $(x+0.1x)/2/(x-2)$, wherein $x=4$ for a diglycidyl ether having a WPE of from about 400 to 550 and $x=6$ to 8 for a diglycidyl ether having a WPE of from about 170 to 250, said resinous intermediate being reacted with said polycarboxylic acid anhydride in an amount to produce a half-ester having an acid value of from about 5 to 35 mg KOH/g.

2. The process of claim 1, wherein the hydroxyalkane monocarboxylic acid is dimethylol propionic acid or lactic acid.

3. The process of claim 1, wherein the polycarboxylic acid anhydride is trimellitic anhydride.

4. The process of claim 1, wherein the esterification catalyst is a tertiary amine.

5. The process of claim 4, wherein the tertiary amine is triethanolamine or benzyldimethylamine.

6. The process of claim 1, wherein the amount of polycarboxylic acid anhydride is calculated to produce a resinous compound having an acid value of from 5 to 15.

7. The process of claim 1, wherein the amount of polycarboxylic acid anhydride is calculated to produce a resinous compound having an acid value of from 20 to 30.

8. A process for the preparation of water-dilutable coating compositions, wherein at least 50% of the carboxyl groups of a resinous compound prepared by the process of claim 1 are neutralized.

9. The process of claim 8, wherein the neutralizing agent is a nitrogen base.

10. The process of claim 9, wherein the nitrogen base is 2-amino-2-methyl-1-propanol or 2-dimethylamine-2-methyl-1-propanol.

11. A thermosetting coating composition comprising a resinous compound prepared by the process of claim 1 and a cross-linking compound in the weight ratio of from about 95:5 to about 70:30, before or after neutralization.

12. The composition of claim 11 wherein the cross-linking compound is an amino-coating compound.

* * * * *